United States Patent
Bischel et al.

(10) Patent No.: US 10,852,137 B2
(45) Date of Patent: Dec. 1, 2020

(54) MULTILAYER WAVEGUIDE OPTICAL GYROSCOPE

(71) Applicant: Gener8, LLC, Sunnyvale, CA (US)

(72) Inventors: William K. Bischel, Menlo Park, CA (US); Lothar A. Reichertz, Oakland, CA (US)

(73) Assignee: Gener8, LLC, Sunnyvale, CA (US)

( * ) Notice: Subject to any disclaimer, the term of this patent is extended or adjusted under 35 U.S.C. 154(b) by 150 days.

(21) Appl. No.: 16/143,357

(22) Filed: Sep. 26, 2018

(65) Prior Publication Data

US 2019/0101392 A1 Apr. 4, 2019

Related U.S. Application Data

(60) Provisional application No. 62/565,564, filed on Sep. 29, 2017.

(51) Int. Cl.
 *G01C 19/72* (2006.01)
 *G01C 19/64* (2006.01)
(52) U.S. Cl.
 CPC .......... *G01C 19/726* (2013.01); *G01C 19/64* (2013.01); *G01C 19/721* (2013.01)
(58) Field of Classification Search
 None
 See application file for complete search history.

(56) References Cited

U.S. PATENT DOCUMENTS

| 5,321,503 | A | * | 6/1994 | Bramson | G01C 19/726 356/464 |
| 6,038,362 | A | * | 3/2000 | Toyoda | G01C 19/722 242/445.1 |
| 6,259,089 | B1 | * | 7/2001 | Vali | G01C 19/722 250/227.19 |
| 6,785,447 | B2 | | 8/2004 | Yoshimura et al. | |

(Continued)

FOREIGN PATENT DOCUMENTS

| CA | 2417113 A1 | 6/2002 |
| EP | 0483993 A2 | 5/1992 |
| JP | 61184417 A | 8/1986 |

OTHER PUBLICATIONS

International Search Report and Written Opinion dated Mar. 11, 2019 in PCT Application No. PCT/US2018/053128.
(Continued)

*Primary Examiner* — Shawn Decenzo
(74) *Attorney, Agent, or Firm* — Paradice and Li LLP

(57) ABSTRACT

A waveguide optical gyroscope includes a multilayer waveguide rotation sensor fabricated on a substrate. The multilayer waveguide rotation sensor includes one or more overlaying non-intersecting, spiraling coils that are vertically separated to reduce or eliminate optical cross coupling. The waveguides are optically coupled by a vertical waveguide and are optically coupled to the other components of the optical gyroscope, including a light source and detector, which may be integrated or fabricated on the substrate. A lithium niobate phase modulator chip may be disposed on
(Continued)

the substrate and optically coupled to the waveguides in the multilayer waveguide rotation sensor. The multilayer waveguide rotation sensor enables a small cross section for the guiding channels thereby achieving a high coil density in a small volume.

32 Claims, 7 Drawing Sheets

(56) References Cited

U.S. PATENT DOCUMENTS

| | | | |
|---|---|---|---|
| 7,106,448 B1* | 9/2006 | Vawter | G01C 19/72 |
| | | | 356/461 |
| 7,310,363 B1 | 12/2007 | Mason et al. | |
| 8,031,343 B2 | 10/2011 | Carothers et al. | |
| 9,212,912 B1 | 12/2015 | Salit et al. | |
| 9,285,540 B2 | 3/2016 | Bauters et al. | |
| 9,562,768 B2 | 2/2017 | Safar | |
| 9,588,296 B2* | 3/2017 | Heaton | G02B 6/14 |
| 9,755,753 B2 | 9/2017 | Blumenthal | |
| 2002/0015154 A1* | 2/2002 | Goldner | G01C 19/722 |
| | | | 356/465 |
| 2003/0053067 A1* | 3/2003 | Hashimoto | G02B 6/4214 |
| | | | 356/465 |
| 2004/0081415 A1 | 4/2004 | Demaray et al. | |
| 2004/0091207 A1* | 5/2004 | Ohno | G01C 19/721 |
| | | | 385/27 |
| 2005/0185879 A1* | 8/2005 | Dawes | G01C 19/721 |
| | | | 385/14 |
| 2008/0074673 A1 | 3/2008 | Tazartes et al. | |
| 2009/0244544 A1* | 10/2009 | Terrel | G01C 19/727 |
| | | | 356/461 |
| 2014/0086527 A1 | 3/2014 | Ban et al. | |
| 2014/0217269 A1* | 8/2014 | Guo | G02B 6/29346 |
| | | | 250/227.14 |
| 2016/0291265 A1 | 10/2016 | Kinghorn et al. | |
| 2016/0327748 A1* | 11/2016 | Stern | H04J 14/04 |
| 2017/0160481 A1* | 6/2017 | Ling | G02B 6/305 |
| 2017/0199037 A1* | 7/2017 | Jain | G02B 6/1225 |
| 2018/0364044 A1* | 12/2018 | Kang | G02F 1/3519 |
| 2018/0375281 A1* | 12/2018 | Puckett | G02F 1/125 |
| 2020/0041270 A1* | 2/2020 | White | H01S 3/06795 |

OTHER PUBLICATIONS

Invitation to Pay Additional Fees dated Jan. 18, 2019 in PCT Application No. PCT/US2018/053128.

Bauters, Jared F. et al., "Planar waveguides with less than 0.1dB/m propagation loss fabricated with wafer bonding," Optical Society of America, Nov. 21, 2011, vol. 19, No. 24.

Shang, Kuanping et al., "Low-loss compact multilayer silicon nitride platform for 3D photonic integrated circuits," Optical Society of America, Aug. 10, 2015, vol. 23, No. 16.

Gundavarapu, Sarat et al., "Integrated ultra-low-loss silicon nitride waveguid coil for optical gyroscopes," Optical Society of America, OFC 2016, W4E.5.

Grenier, Jason R. et al., "Femtosecond laser writing of optical edge filters in fused silica optical waveguides," Optical Society of America, Feb. 25, 2013, vol. 21, No. 4.

Shupe, D.M, "Thermally induced non-reciprocity in the fiber-optic interferometer," Appl. Opt.19 , 654-655, 1980.

Lefevre, Herve, "The Fiber-Optic Gyroscope," ISBN 0-89006-537-3, Artech House, Inc., 1993.

Pavlath, George A., Fiber optic gyros: the vision realized, Proceedings of SPIE 6314, Aug. 24, 2016.

* cited by examiner

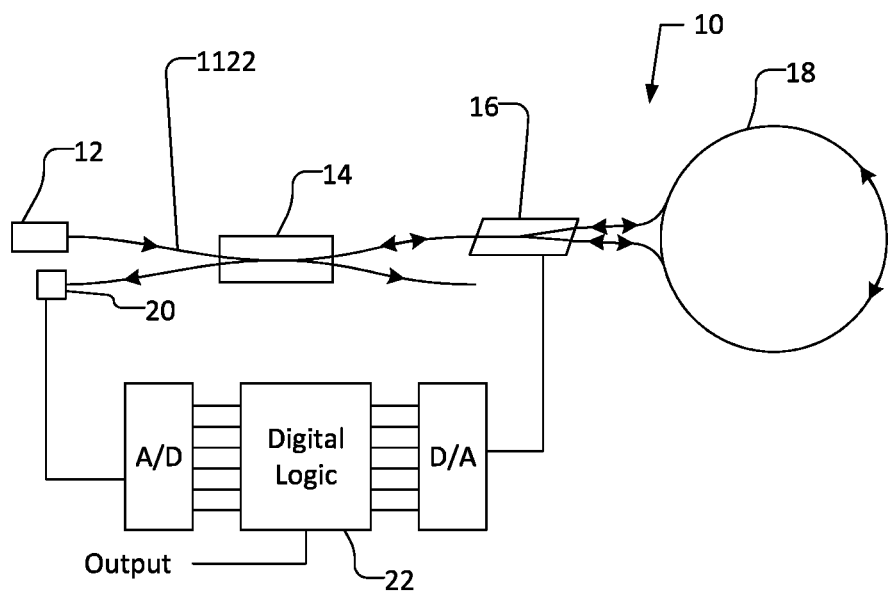
Fig. 12
(Conventional)

MULTILAYER WAVEGUIDE OPTICAL GYROSCOPE

CROSS REFERENCE TO RELATED APPLICATIONS

This application claims priority under 35 USC 119 to U.S. Provisional Application No. 62/565,564, entitled "MULTILAYER WAVEGUIDE OPTICAL GYROSCOPE," filed Sep. 29, 2017, which is incorporated herein by reference in its entirety.

FIELD OF THE INVENTION

The present invention relates to optical gyroscopes, and in particular to waveguide optical gyroscopes.

BACKGROUND

The most common implementation of an optical gyroscope is the Fiber Optic Gyroscope (FOG). A typical FOG includes an Amplified Spontaneous Emission (ASE) source, splitter, Integrated Optics Chip (IOC), fiber optic coil assembly and receiver. Typical application includes one to three gyros. Conventional FOG applications, such as tactical (0.1 to 1 deg/hr) and navigational (0.001 to 0.01 deg/hr) grade applications, are limited by the gyro size and cost. The performance of the FOG can be estimated by the sensor sensitivity factor LD (Length×Diameter). High accuracy performance is limited by the temperature residuals and the mechanical/optical long term stability.

FIG. 12 illustrates a conventional architecture of a standard high accuracy FOG device 10. The operation of a FOG is based on the Sagnac effect which produces a phase shift between the clockwise and counter clockwise propagating optical beams in a fiber ring interferometer. This phase shift is proportional to the rotation rate of the interferometer. The FOG device 10 is comprised of the following optical components: 1) a broad-band optical source 12, typically either a superluminescent light emitting diode (SLED) or an erbium doped fiber-based amplified spontaneous emission (ASE) optical source, 2) an X-coupler 14 that splits the light into two equal beams for both the forward and backward propagating beams, 3) a lithium niobate multi-function integrated optical circuit (IOC) 16, a fiber optic coil 18, and a photodiode detector 20. The IOC 16 has the following components integrated into the chip: a) a Y-coupler that splits the beam into two equal intensity forward propagating beams, b) a phase modulator of the light propagating in the two beams that is accomplished by applying a voltage to the waveguides fabricated in the lithium niobate optical chip, and c) a polarizer of the two output beams that has an extinction ratio of greater than 60 dB. The fiber optic coil 18 typically has 150 meters to 4 km of fiber with coil diameters of 2-20 cm or larger. The fiber optic coil 18 typical has a quadrupole winding pattern that may have 4-1000 layers depending on the design. The two output fibers from the IOC 16 are spliced onto the two fiber leads of the fiber optic coil 18. The clockwise and counter clockwise propagating beams in the fiber coil return to the IOC 16 and interfere in the Y-coupler to produce a bright fringe (or 100% transmission) when the interferometer is at rest. A single beam propagates into the input waveguide of the Y-coupler on the IOC 16 and back into the X-coupler 14. Typically 50% of the light entering back into the X-coupler is split into a fiber that is coupled to the photodiode detector 20. When the interferometer rotates, the phase shift induced by the Sagnac effect causes the transmission to change. The change in transmission is detected using a digital logic circuit 22.

The standard FOG architecture suffers from several disadvantages. For example, the standard FOG architecture suffers from cost and size disadvantages. There are a large number of discrete components and long segments of fiber between components with the associated handling, packaging, and yield issues. The fiber optic coil structure is large and highly complex requiring an expensive, special winding approach. The cost of a FOG architecture is high due to the high integration and packaging cost as well as components cost. Moreover, standard FOG architecture suffers from reliability issues due to the large number of components and the individual failure rate of each component. Further, the overall size of the FOG architecture is large due to the need to accommodate all the components and the fiber coil without added stress and performance degradation.

Additionally, the standard FOG architecture suffers from performance disadvantages. For example, leading error sources for the gyro bias are the degree of polarization control of the coil fiber, polarization cross coupling in many fiber segments, back reflection in the optical path, magnetic properties of the fiber, nonlinear properties of the fiber, and thermal/mechanical gradients in the sensor coil. These errors are only partially mitigated with a choice of a low ripple, symmetric and wide spectral width source as well as by a sophisticated, expensive winding methodology and tight control of fiber lengths in the optical strings to reduce the effect of the many cross coupling points and temperature gradients. The standard FOG architecture is limited due to the large number of coupling points over the many segments of fiber and splice points and variation of these fiber segments and components over temperature. For example, the coil structure necessarily includes many "cross-overs" that degrade the bias performance.

SUMMARY

A waveguide optical gyroscope includes a multilayer waveguide rotation sensor fabricated on a substrate. The multilayer waveguide rotation sensor includes one or more overlaying non-intersecting, spiraling coils that are vertically separated to reduce or eliminate optical cross coupling. The waveguides are optically coupled by a vertical waveguide and are optically coupled to the other components of the optical gyroscope, including a light source and detector, which may be integrated or fabricated on the substrate. A lithium niobate phase modulator chip may be disposed on the substrate and optically coupled to the waveguides in the multilayer waveguide rotation sensor. The multilayer waveguide rotation sensor enables a small cross section for the guiding channels thereby achieving a high coil density in a small volume.

In one implementation, an optical gyroscope includes a multilayer waveguide rotation sensor disposed on a substrate, the multilayer waveguide rotation sensor includes a first waveguide that is a non-intersecting, spiraling coil; a second waveguide vertically separated from the first waveguide; and a vertical waveguide coupler optically coupling the first waveguide to the second waveguide.

In one implementation, an optical gyroscope includes a substrate; a multilayer waveguide rotation sensor disposed on the substrate and comprising a plurality of waveguides that overly each other and are vertically separated, wherein at least one of the waveguides in the plurality of waveguides is a non-intersecting, spiraling coil; a light source disposed on the substrate and optically coupled to provide light to the multilayer waveguide rotation sensor through an X-waveguide coupler disposed on the substrate and through a modulator chip disposed on the substrate; and a detector disposed on the substrate and optically coupled to receive light from the multilayer waveguide rotation sensor through the modulator chip and the X-waveguide coupler.

In one implementation, an optical gyroscope includes a waveguide rotation sensor disposed on a substrate, the waveguide rotation sensor includes a first waveguide that is a non-intersecting, spiraling coil; a first waveguide coupler disposed on the substrate and optically coupled to a first end of the first waveguide that is at an outside diameter of the non-intersecting, spiraling coil; and a second waveguide coupler disposed on the substrate and optically coupled to a second end of the first waveguide that is at an inside diameter of the non-intersecting, spiraling coil.

BRIEF DESCRIPTION OF THE DRAWINGS

FIG. 12 illustrates a conventional architecture of a standard high accuracy Fiber Optic Gyroscope device.

DETAILED DESCRIPTION

Figure 1:
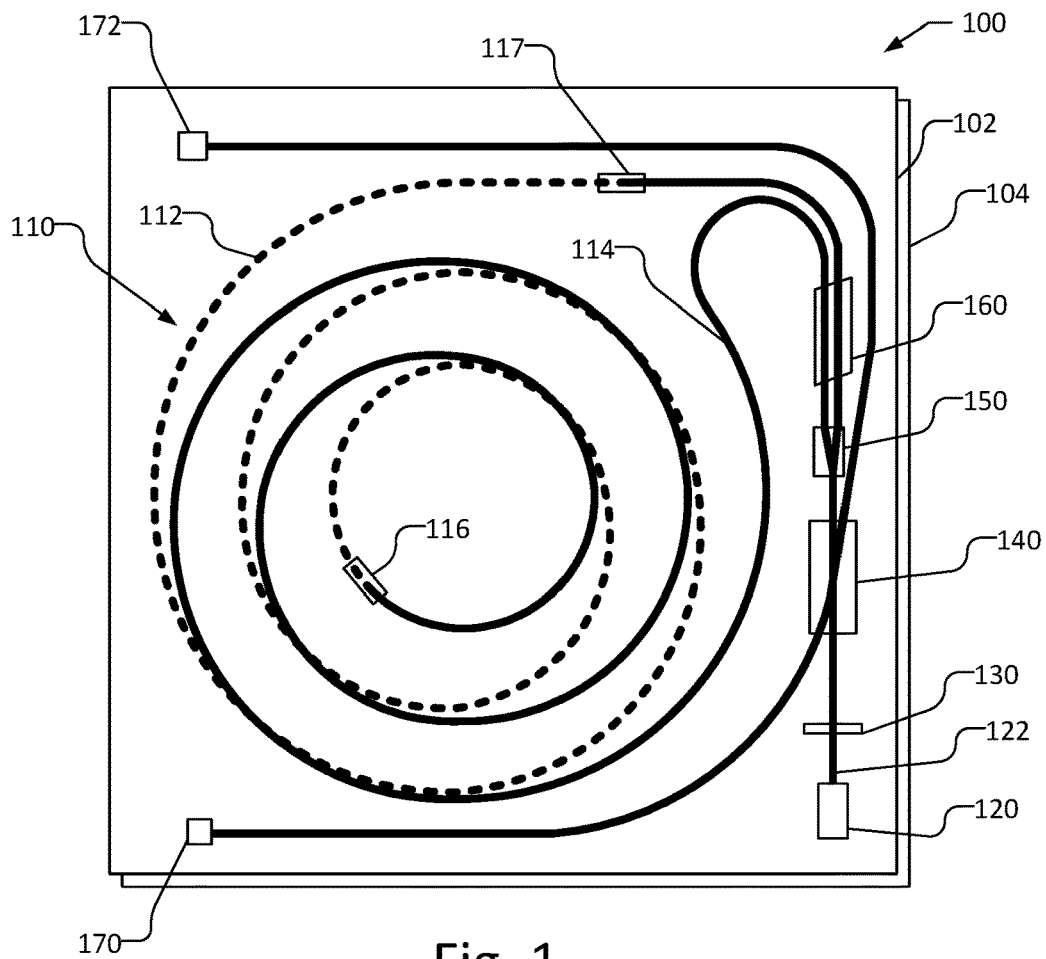
FIG. 1 illustrates top view of a waveguide optical gyroscope that includes a multilayer waveguide rotation sensor.

FIG. 1 illustrates top view of a waveguide optical gyroscope 100 that includes a multilayer waveguide rotation sensor 110. The multilayer waveguide rotation sensor 110 includes a substrate 102 with an overlying lower waveguide 112, illustrated with a dashed line, and an upper waveguide 114, illustrated with a solid line, that overlies the lower waveguide 112. The lower waveguide 112 is illustrated as a non-intersecting, spiraling coil and the upper waveguide 114 is likewise illustrated as a non-intersecting, spiraling coil. The lower waveguide 112 and the upper waveguide 114 are vertically separated from each other to reduce or eliminate optical cross coupling. The lower waveguide 112 and the upper waveguide 114 are optically coupled by a vertical waveguide coupler 116. The vertical waveguide coupler 116 may optically couple the lower waveguide 112 and the upper waveguide 114 evanescently. Alternatively, the vertical waveguide coupler 116 may optically couple the lower waveguide 112 and the upper waveguide 114 directly, e.g., as a laser written waveguide coupler. Other types of vertical couplers may include a pair of out-of-plane mirrors fabricated into the wafer substrate, a pair of micro-prisms that are mounted in trenches that would be etched at the location of the vertical coupler, or other appropriate couplers.

As illustrated in FIG. 1, the lower waveguide 112 and the upper waveguide 114 coil in opposite directions, e.g., the lower waveguide 112 is illustrated as coiling in a counter-clockwise direction (from outside to inside) while the upper waveguide 114 is illustrated as coiling in a clockwise direction (from outside to inside). The vertical waveguide coupler 116 is illustrated as optically coupling the lower waveguide 112 and the upper waveguide 114 at inside diameters of the coils, with light entering and exiting the lower waveguide 112 and the upper waveguide 114 at outside diameters of the coils. If desired, however, the vertical waveguide coupler 116 may optically couple the lower waveguide 112 and the upper waveguide 114 at outside diameters of the coils, with light entering and exiting the lower waveguide 112 and the upper waveguide 114 at inside diameters of the coils, which may require additional waveguide layers and vertical waveguide couplers. Alternatively, the lower waveguide 112 and the upper waveguide 114 may coil in the same directions, e.g., where light enters and exits the lower waveguide 112 at an outside (or inside) diameter of the coil and light enters and exits the upper waveguide 114 at the opposite diameter of the coil, e.g., at the inside (or outside) position of the coil, which may require additional waveguide layers and vertical waveguide couplers.

The multilayer waveguide rotation sensor 110 advantageously enables a smaller cross section for the guiding channels and, thus, a higher coil density in a smaller volume than found in conventional FOG type architectures may be achieved. For example, a typical optical fiber has a core diameter of 10 microns with external cladding and buffer of up to 155 microns. In some implementations, the multilayer waveguide rotation sensor 110, on the other hand, may have a waveguide-to-waveguide spacing of only 20 microns or less. Moreover, the multilayer waveguide rotation sensor may have a relatively small height with respect to conventional FOG type architectures. For example, in some implementations, with the two waveguide layers fabricated on the same substrate 102, the total height of the multilayer waveguide rotation sensor 110 is approximately the thickness of the wafer which is less than 1 mm. The absence of optical fibers may reduce the volume and may increase the ruggedness and reliability of the rotation sensor. Further, with no channel crossovers in the coil and with the use of intrinsic polarization preserving waveguides the polarization induced error may be eliminated, resulting in improved bias performance. Additionally, the planar "semiconductor like" manufacturing process of the multilayer waveguide rotation sensor 110 may reduce production cost and may improve repeatable performance compared to conventional FOG architectures.

As illustrated in FIG. 1, in addition to the multilayer waveguide rotation sensor 110, the waveguide optical gyroscope 100 may include additional optical components that are integrated or fabricated on the substrate 102, which is sometimes referred to as a Photonic Lightwave Circuit (PLC). For example, the waveguide optical gyroscope 100 may include a light source 120, such as a Superluminescent Laser Diode (SLD) broadband light source. If desired, the light source may be a fiber-based Er:fiber Amplified Spontaneous Emission (ASE) source, which may be off-chip. The light source 120 is optically coupled to the multilayer waveguide rotation sensor 110 via a waveguide 122 which is optically coupled to a waveguide isolator 130, an X-waveguide coupler 140, a Y-waveguide coupler 150, and a Lithium Niobate (LN) phase modulator chip 160. As illustrated, the waveguide 122 is coupled directly to the upper waveguide 114 of the multilayer waveguide rotation sensor 110 and is coupled to the lower waveguide 112 with a second vertical waveguide coupler 117, which may be considered part of the multilayer waveguide rotation sensor 110. The waveguide optical gyroscope 100 further includes a light detector 170, which may be a photodiode 170, that receives the returning light via X-waveguide coupler 140. The waveguide optical gyroscope 100 may include additional or fewer components. For example, the waveguide optical gyroscope 100 may include a second light detector 172, e.g., photodetector, that measures relative input noise (RIN) from the light source 120 via the X-waveguide coupler 140. If desired, the Y-waveguide coupler 150 may be integrated within the LN phase modulator chip 160. All or some of various components of the waveguide optical gyroscope 100 may be integrated or fabricated on the substrate 102. Alternatively, all or some of various components of the waveguide optical gyroscope 100 may be fabricated on one or more separate chips that are optically coupled to the multilayer waveguide rotation sensor 110 on the substrate 102.

Thus, all optical functions used in the waveguide optical gyroscope 100 may be integrated into the substrate 102, which may then be mounted on a printed circuit board 104, e.g., of the same size, which may incorporate the electronics (illustrated in FIGS. 11A and 11B) used to drive the light source 120 and LN phase modulator chip 160 and condition the signals from photodiode 170 (and 172) for analysis.

Figure 2:
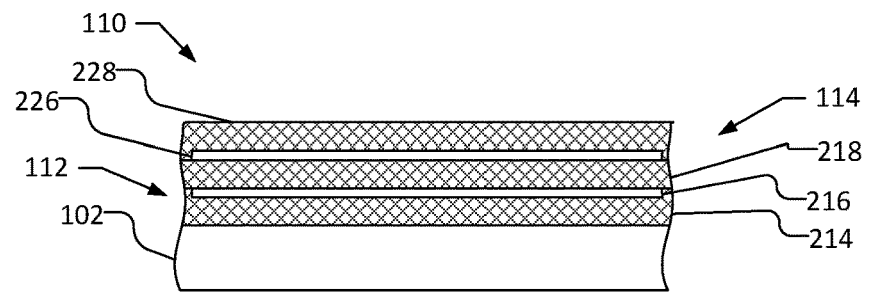
FIG. 2 illustrates a side view of multilayer waveguide rotation sensor.

FIG. 2 illustrates a side view of multilayer waveguide rotation sensor 110. As illustrated, the multilayer waveguide rotation sensor 110 includes a substrate 102, the lower waveguide 112 and the overlying upper waveguide 114. The substrate may be a silicon wafer, which is advantageous as these types of wafers are manufactured in high volume, are available in a large diameter (up to 12") with exceptionally low surface roughness (<0.2 nm RMS) and have a very low number of surface defects per square centimeter. If desired, however, other substrates may be used including fused silica and various glass materials (such as BK7), all of which are manufactured in wafers or sheets with large area and low surface roughness. These "glass like" substrates have the advantage that they are transparent dielectrics and therefore may form the bottom cladding layer 214 for the waveguide cladding. Each waveguide layer is formed with bottom and top cladding layers and a core layer disposed between the cladding layers. The cladding layers and core layers have different indices of refraction, with the core layer having the higher index of refraction. The core layer material may be stoichiometric $Si_3N_4$ (hereafter denoted as SiN) with an index of refraction of ~2 at 1550 nm. The core layer may be fabricated from any other type of dielectric or semiconductor material that can be deposited as a thin film and has an index in the range of 1.7-3.5 coupled with low material absorption in the range of 1525-1650 nm (k<0.01 dB/m). Examples of core layer materials that fall in this index range include (but are not limited to) silicon (Si; n~3.47), titanium dioxide ($TiO_2$; n=2.45) hafnium dioxide ($HfO_2$; n~2.07), aluminum oxide ($Al_2O_3$; n~1.74), tantalum pentoxide ($Ta_2O_5$; n~2.06) and niobium pentaoxide ($Nb_2O_5$; n~2.23).

As illustrated, the lower waveguide 112 is formed on the substrate 102 and includes a bottom cladding layer 214 (if the substrate 102 is not suitable as a cladding layer), a core layer 216, and a top cladding layer 218. The upper waveguide 114 include core layer 226 and bottom cladding layer 218 (which is the same as the top cladding layer 218 for the lower waveguide 112) and top cladding layer 228. As illustrated, the cladding material extends over the sides of the core layers 216 and 226. The lower waveguide 112 and upper waveguide 114, i.e., the core layer 216 and core layer 226 are separated sufficiently to prevent optical coupling. By way of example, the lower waveguide 112 and upper waveguide 114 may be vertically separated by at least 1.5 times the width of the waveguides, and more particularly may be separated by at least 2 times the width of the waveguides. In one implementation, for example, the lower waveguide 112 and upper waveguide 114 may have slightly different widths with an average of approximately 5 microns and the lower waveguide 112 and upper waveguide 114 may be vertically separated by 10 microns. Each waveguide 112, 114 may have, e.g., between 20 to 1000 or more loops, with an outside diameter of, e.g., 28 mm, to produce a waveguide length of 20 m to 80 m or more. The resulting footprint of the multilayer waveguide rotation sensor 110 may be relatively small, e.g., in one implementation may be e.g., 32×32 mm or less.

The waveguides 112 and 114 may be lithographically defined as non-intersecting, spiraling waveguide coils using conventional deposition, projection lithography, etching and polishing techniques known to those of ordinary skill in the art. By way of example, the waveguide fabrication process described by J. Bauters, et al., "Planar waveguides with less than 0.1 dB/m propagation loss fabricated with wafer bonding," Opt. Exp. 19, 24090 (2011), which is incorporated by reference, may be used. Other suitable fabrications processes may alternatively be used to form the waveguides 112 and 114 in the multilayer waveguide rotation sensor 110.

Figure 3:
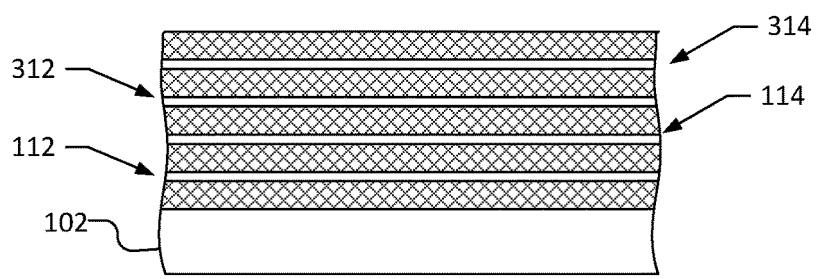
FIG. 3 illustrates a side view of a multilayer waveguide rotation sensor that includes four waveguide layers.

If desired, the multilayer waveguide rotation sensor may include more than two waveguide layers. For example, FIG. 3 illustrates a side view of a multilayer waveguide rotation sensor 310, which may be used in the waveguide optical gyroscope 100, and that includes four waveguide layers. The multilayer waveguide rotation sensor 310 is illustrated with waveguides 112 and 114, and additionally includes overlying waveguides 312 and 314. For example, waveguides 312 and 314 may be non-intersecting, spiraling waveguide coils similar to waveguides 112 and 114, where waveguide 312 coils in the same direction as waveguide 112, and waveguide 314 coils in the same direction as waveguide 114. When used in place of the multilayer waveguide rotation sensor 110 in the waveguide optical gyroscope 100, the upper waveguide 314 may be coupled to the light source 120 (shown in FIG. 1) in place of waveguide 114, and the waveguide 114 may be vertically coupled to the waveguide 312, e.g., at the outside diameter of the coils, and the waveguide 312 may be vertically coupled to the waveguide 314 at the inside diameter of the coils. With the use of additional waveguide layers 312, 314 in the form of non-intersecting, spiraling waveguide coils, the multilayer waveguide rotation sensor 310 may effectively double the length of the waveguides relative to multilayer waveguide rotation sensor 110.

Alternatively, the top and lower waveguides illustrated in FIG. 3, e.g., waveguides 112 and 314 may be linear waveguides that are used, e.g., to couple the light source 120 (shown in FIG. 1) to the inner diameters of the waveguides 114 and 312, and the waveguides 114 and 312 are optically coupled with a vertical optical coupler located at the outside diameter of the coils.

Figure 4:
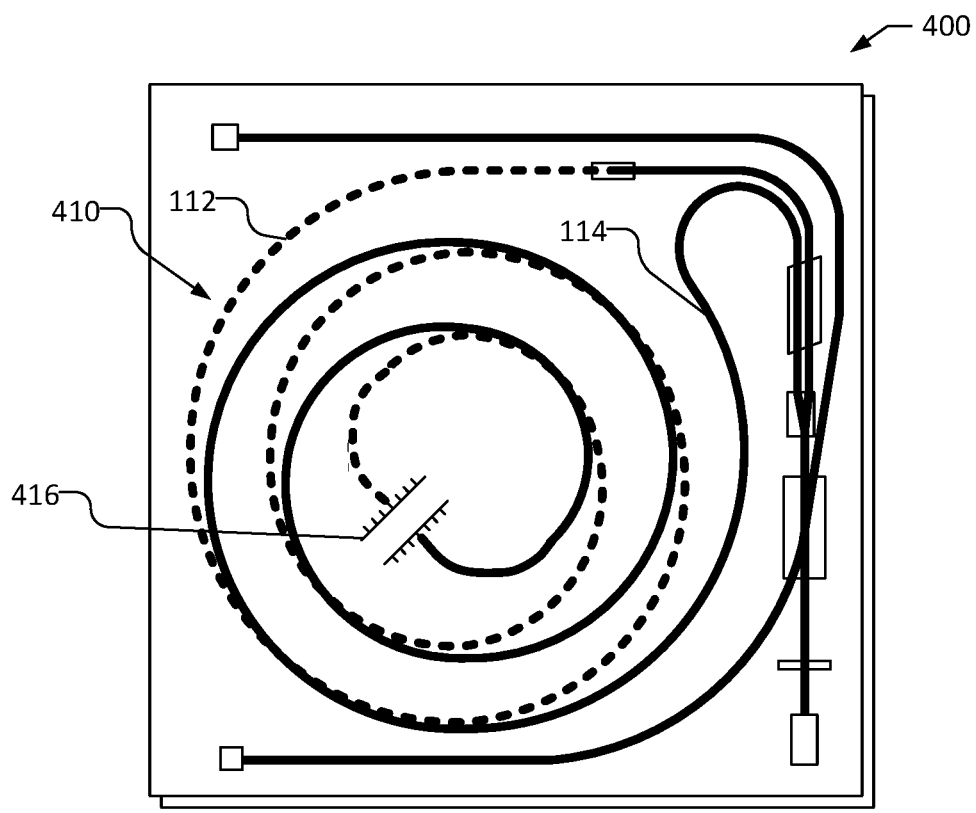
FIG. 4 illustrates a top view of another embodiment of a waveguide optical gyroscope.

FIG. 4 illustrates a top view of another embodiment of a waveguide optical gyroscope 400, which is similar to waveguide optical gyroscope 100, shown in FIG. 1, like designated elements being the same. Waveguide optical gyroscope 400 includes a multilayer waveguide rotation sensor 410 with lower waveguide 112, illustrated as a non-intersecting, spiraling coil and upper waveguide 114 that is likewise illustrated as a non-intersecting, spiraling coil, that coils in the opposite direction. The lower waveguide 112 and the upper waveguide 114 are vertically separated and are optically coupled by a vertical waveguide coupler 416. Vertical waveguide coupler 416 may be, e.g., a laser written waveguide coupler that directly couples the lower waveguide 112 and upper waveguide 114 using known techniques, such as those described in Jason R. Grenier, et al, "Femtosecond laser writing of optical edge filters in fused silica optical waveguides," Opt. Exp. 21, 4493 (2013), and references therein, which are incorporated herein by reference.

As illustrated in FIGS. 1 and 4, the lower waveguide 112 and upper waveguide 114 coil in opposite direction and cross twice per revolution at a small angle, e.g., ~0.1 degree, which may cause significant cross coupling. For long waveguide coils, the waveguides may cross several hundred times. Without precautions to minimize cross coupling, the lower waveguide 112 and upper waveguide 114 may suffer from significant losses. In one implementation, cross coupling may be reduced by including a relatively large vertical separation between the waveguide layers. For example, as discussed above, the lower waveguide 112 and upper waveguide 114 may be vertically separated by at least 1.5 times the width of the waveguides, and more particularly may be separated by at least 2 times the width of the waveguides. In one implementation, for example, the lower waveguide 112 and upper waveguide 114 may be vertically separated by 7.5 microns or more, and more particularly by 10 microns. With use of a large vertical separation, the loss per crossing of the waveguides 112 and 114 may be less than −30 dB.

Figure 5:
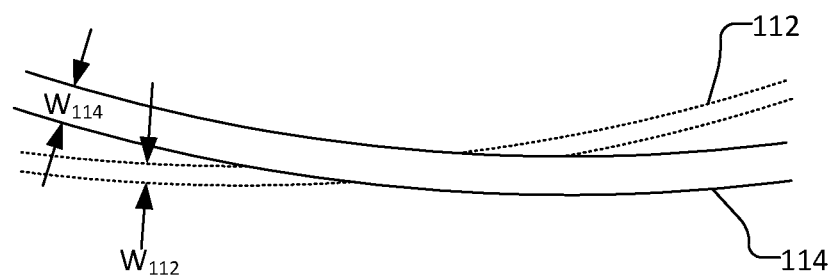
FIG. 5 illustrates a crossing of the lower waveguide and the upper waveguide in the multilayer waveguide rotation sensor.
Figure 6:
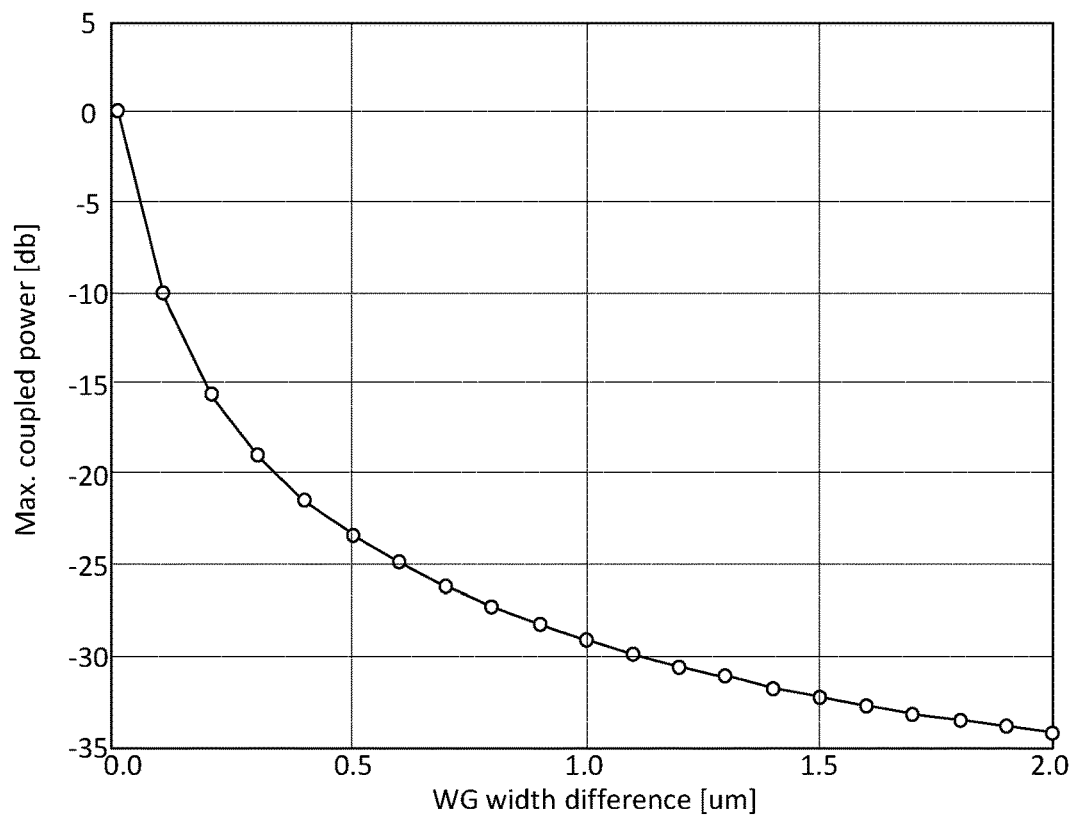
FIG. 6 is a graph of simulation data for vertical coupling of waveguides with different widths in two layers.

In an alternative or additional implementation, the lower waveguide 112 and upper waveguide 114 may have different widths in order to reduce cross coupling. FIG. 5, by way of example, illustrates a crossing of the lower waveguide 112 and the upper waveguide 114. As can be seen, the lower waveguide 112 has a width $W_{112}$ and the upper waveguide 114 has a width $W_{114}$, which is significantly different than the width $W_{112}$. FIG. 6 is a graph of simulation data for vertical coupling of waveguides with different widths in two layers separated by 10 microns, where the x axis represents the difference in width of the waveguides and the y axis represents the maximum coupled power. The simulation is for waveguides that are completely overlapping, as opposed to crossing at small angles, and is therefore a worst case scenario. As can be seen in FIG. 6, as the difference in waveguide width varies from 0, i.e., equal widths, to 2 microns, the worst case coupling drops quickly, with a maximum coupled power of approximately −30 dB where there is a width difference of 1 micron. The actual cross coupling will likely be less than illustrated in FIG. 6 because the lower waveguide 112 and upper waveguide 114 cross at a small angle and do not completely overlap. Accordingly, a width difference and vertical separation between the lower waveguide 112 and upper waveguide 114 may be selected to reduce cross coupling to a desired level. By way of example and not limitation, a waveguide width difference of approximately 1 micron may be used, e.g., waveguides 112 and 114 may have widths of 4.5 microns and 5.5 microns, and a vertical separation of 10 microns may be used, but other vertical separations and/or width differences may be used if desired.

Figure 7:
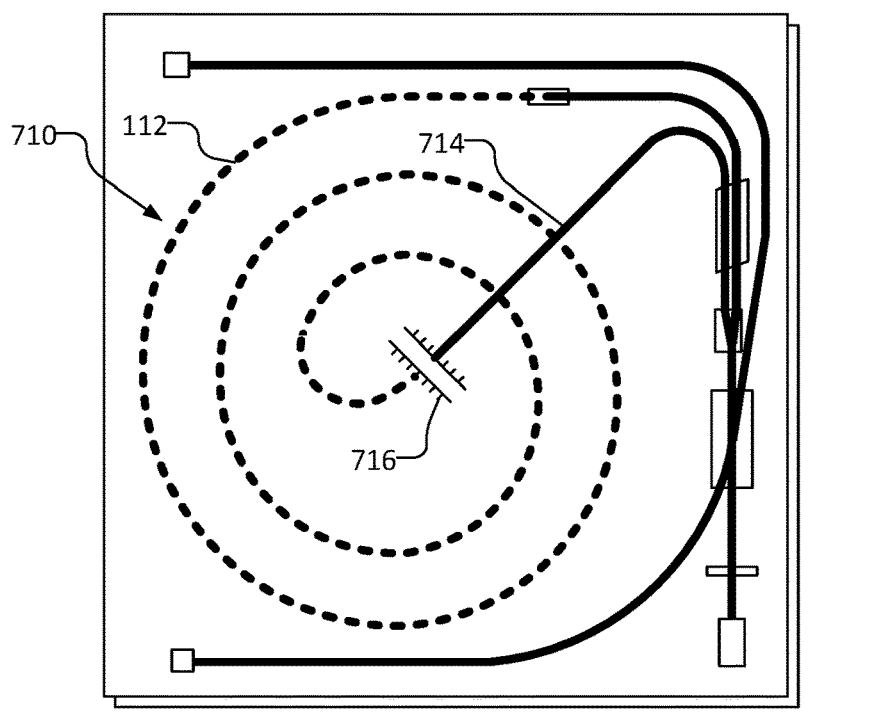
FIG. 7 illustrates a top view of another embodiment of a waveguide optical gyroscope.

FIG. 7 illustrates a top view of another embodiment of a waveguide optical gyroscope 700, which is similar to waveguide optical gyroscope 100, shown in FIG. 1, like designated elements being the same. Waveguide optical gyroscope 700 includes a multilayer waveguide rotation sensor 710 with a lower waveguide 112, illustrated as a non-intersecting, spiraling coil and a linear upper waveguide 714 that is vertically separated from the lower waveguide 112, but that orthogonally intersects the lower waveguide 112, i.e., crosses the lower waveguide 112 at a 90 degree angle, to prevent cross coupling. The use of linear upper waveguide 714 is advantageous as there is no cross coupling between the two waveguide layers. If desired, the lower waveguide may be linear and the upper waveguide may be a non-intersecting, spiraling coil. The lower waveguide 112 and the upper waveguide 714 are illustrated as being optically coupled by a vertical waveguide coupler 716 that may be, e.g., a laser written waveguide coupler that directly couples the lower waveguide 112 and upper waveguide 714. If desired, a vertical waveguide coupler 716 may evanescently couple the lower waveguide 112 and the upper waveguide 714, as illustrated in FIG. 1.

Figure 8A:
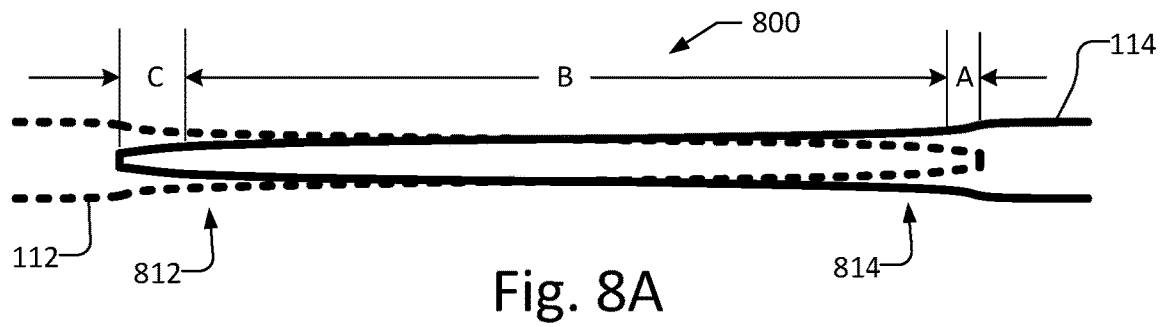
FIGS. 8A and 8B illustrate a top view and a side view, respectively, of a vertical waveguide coupler that may be used in a multilayer waveguide rotation sensor.
Figure 8B:
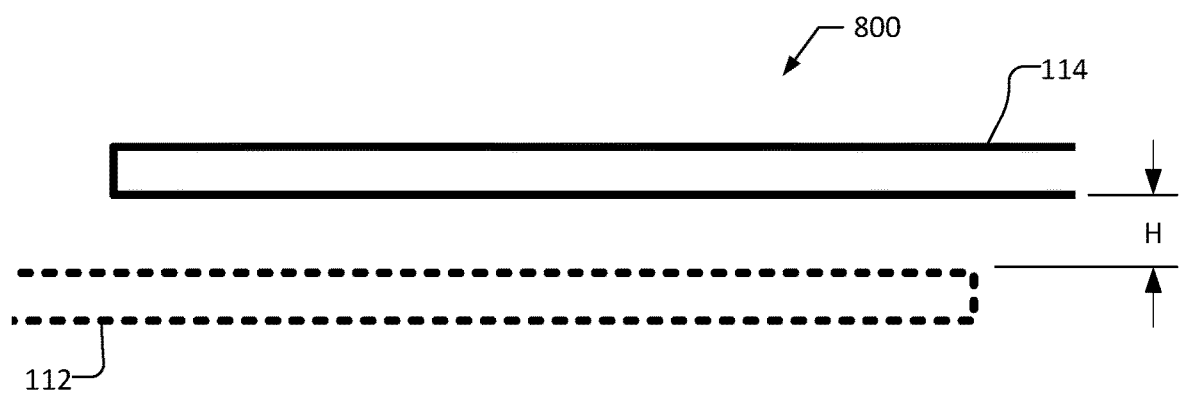

FIGS. 8A and 8B illustrate a top view and a side view of a vertical waveguide coupler 800, which may serve as vertical waveguide coupler 116 and/or 117 in waveguide optical gyroscope 100 shown in FIG. 1. The vertical waveguide coupler 800 evanescently couples waveguides, such as the lower waveguide 112 and the upper waveguide 114 in the multilayer waveguide rotation sensor 110 that are vertically separated by a distance H. As illustrated, the vertical waveguide coupler 800 includes a non-linearly tapered portion 812 at an end of the lower waveguide 112 and a non-linearly tapered portion 814 at the end of the upper waveguide 114 that overlies the non-linearly tapered portion 812 at the end of the lower waveguide 112. As illustrated by regions A, B, and C of the non-linearly tapered portion 814 at the end of the upper waveguide 114, the non-linearly tapered portions 812 and 814 may have at least at least three regions with different non-linear taper geometries. In one implementation, the non-linearly taper for portions 812 and 814 may be a function of a tangent curve, i.e., the non-linearly tapered portions 812 and 814 may be said to be tangentially tapered. The width (w) of the non-linearly tapered portions 812 and 814 in the vertical waveguide coupler 800 may be calculated as a function of length (x) using the formula:

$$w(x) = W_{inp} - (W_{inp} - W_{end}) \frac{B + \tan t}{2B} \quad \text{eq. 1}$$

with $$B = \tan A \quad \text{eq. 2}$$

$$t = A\left(\frac{2x}{L} - 1\right) \quad \text{eq. 3}$$

Here the range of x is from 0 to L, where L is the final length of the tapered vertical waveguide coupler 800. The parameters may be defined as:

1) Input waveguide width: $W_{inp}$. The range of $W_{inp}$ is from 2-10 microns.

2) Waveguide width at the end of the taper: $W_{end}$. The range of $W_{end}$ is between 0.5-2 microns.
3) Taper parameter: A. The range of A is between 1.0 and 1.5.

The interaction length of the vertical waveguide coupler 800, i.e., the length of combined regions A, B, and C of the non-linearly tapered portions 812 and 814, is sufficient to provide the desired coupling efficiency at the selected vertical separation. For example, where the lower waveguide 112 and upper waveguide 114 are vertically separated by a distance H that is at least 1.5 times the width of the waveguides, e.g., a vertical separation of 10 microns, the vertical waveguide coupler may evanescently couples the waveguides with at least 80% coupling efficiency and more particularly at least 90%, with an interaction length of 7.5 mm or more, e.g., up to 18 mm or more.

In addition to providing good coupling efficiency when there is a relatively large vertical separation between the lower waveguide 112 and the upper waveguide 114, e.g., 10 microns, the coupling efficiency of the vertical waveguide coupler 800 is insensitive to misalignment between the masks for the lower waveguide 112 and the upper waveguide 114, as well as variations in layer thickness. For example, simulations demonstrate that the coupling efficiency of the vertical waveguide coupler 800 is insensitive to a misalignment between the masks for the lower waveguide 112 and the upper waveguide 114 of up to 0.5 microns, and insensitive to a variation in vertical separation of up to 1 micron. Thus, the vertical waveguide coupler 800 is tolerant to changes, e.g., in layer separation and misalignment, that might be present in a typical high yield manufacturing environment. In contrast, conventional vertical waveguide couplers with equivalent widths but without a non-linear taper geometry are relatively sensitive to any change in nominal conditions, and typically the coupling efficiency may be reduced by 10 dB (e.g., a reduction by a factor of 10 loss of coupling efficiency) or more with changes in layer separation or different waveguide widths of a few 0.1 s of a micron, or misalignment between the upper and lower waveguide layers by 0.5 microns or more.

Figure 9:
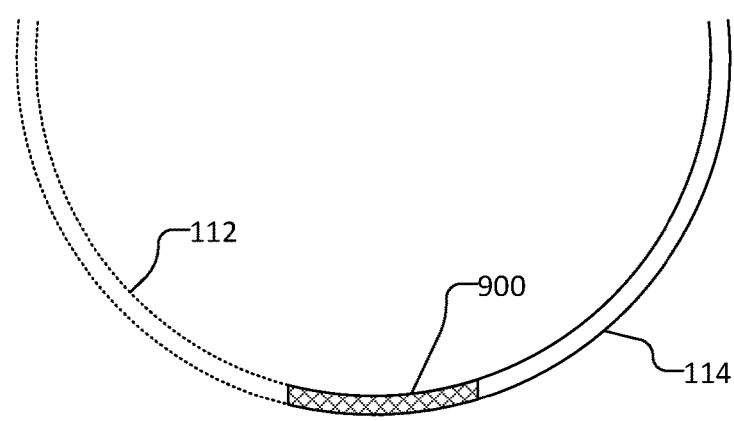
FIG. 9 illustrates a vertical waveguide coupler between lower waveguide and upper waveguide that may be used in a multilayer waveguide rotation sensor.

Additionally, simulations demonstrate that the coupling efficiency of the vertical waveguide coupler 800 is insensitive to an interaction length vertical waveguide coupler 800 from 7.5-22 mm to enable different inside diameters of the waveguide. As illustrated in FIG. 1, for example, the vertical waveguide coupler may be positioned at the inside diameter of the waveguides, and thus, the vertical waveguide coupler may have a radius of curvature. FIG. 9, by way of example, illustrates a vertical waveguide coupler 900 between lower waveguide 112 and upper waveguide 114. The vertical waveguide coupler 900 may be similar to vertical waveguide coupler 800 shown in FIG. 8. As can be seen in FIG. 9, vertical waveguide coupler 900 has a radius of curvature matching the curvature of the lower waveguide 112 and the upper waveguide 114. The vertical waveguide coupler 900 should have a radius of curvature that is equal to or larger than the minimum radius of curvature supported by the waveguides 112, 114, e.g., where the minimum radius of curvature supported by the waveguides 112, 114 may be defined as a radius of curvature at which a waveguide turning 360 degrees has a 1 db loss, although greater loss may be acceptable if desired. For example, the vertical waveguide coupler 900 may have a radius of curvature that is at least 1.5 times the minimum radius of curvature supported by the waveguides 112, 114. In addition, the radius of curvature of the vertical coupler can be changed adiabatically over the length of the coupler if needed for a particular design or implementation as long as the maximum radius of curvature define above is not exceeded.

As discussed above in FIG. 1, in addition to the multilayer waveguide rotation sensor 110, the waveguide optical gyroscope 100 may include some or all optical components integrated or fabricated on the substrate 102 (PLC). Thus, for example, one or more of the light source 120, waveguide 122, X-waveguide coupler 140, and Y-waveguide coupler 150 may be integrated on the substrate 102 (PLC) in a conventional fashion.

Figures 10A, 10B:
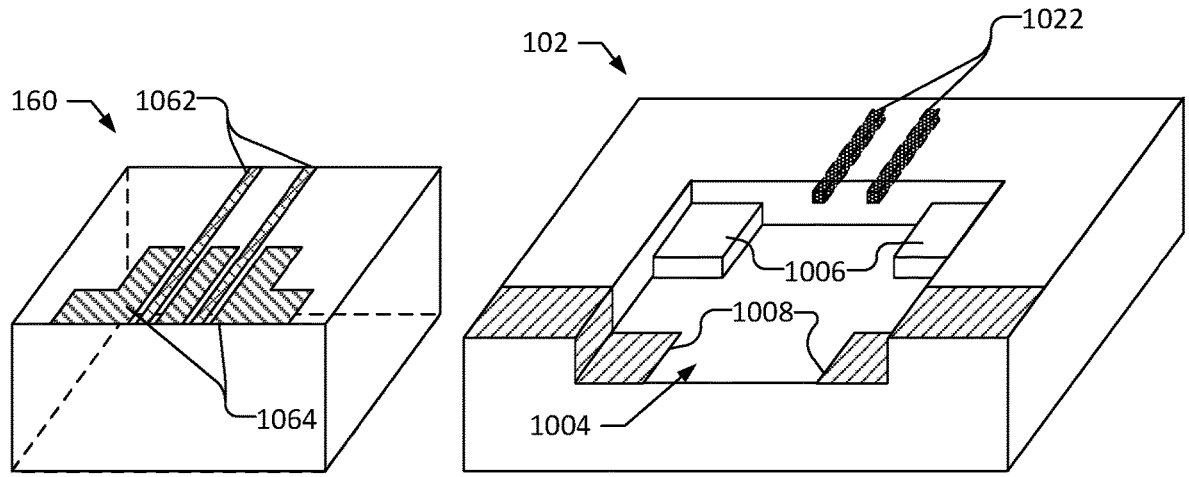
FIGS. 10A, 10B, and 10C respectively illustrate perspective views of a Lithium Niobate (LN) phase modulator chip, an etched cavity in portion of the substrate etched to accept the LN phase modulator chip, and the LN phase modulator chip inverted and mounted in the etched cavity of the substrate.
Figure 10C:
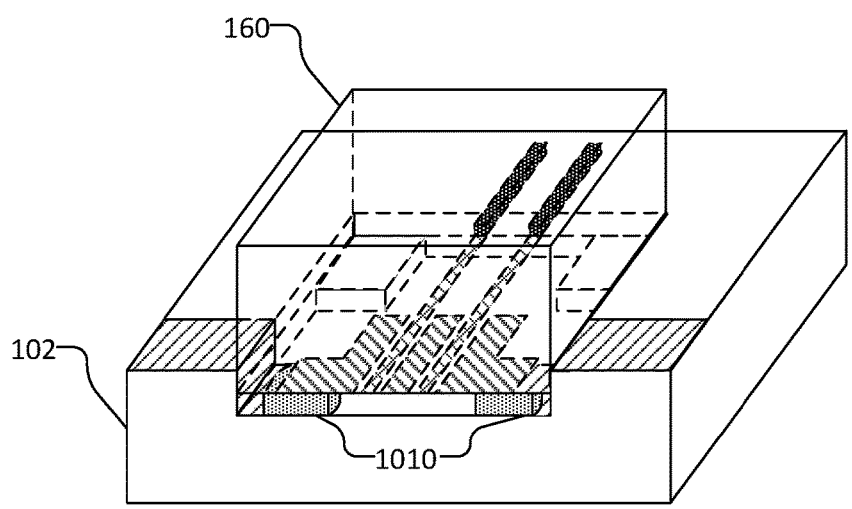

The Lithium Niobate (LN) phase modulator chip 160 may be integrated into the substrate 102 (PLC). FIGS. 10A, 10B, and 10C illustrate perspective views of the LN phase modulator chip 160, a portion of the substrate 102 (PLC), and the LN phase modulator chip 160 inverted and mounted to the substrate 102 (PLC), respectively. The LN phase modulator chip 160 is illustrated in FIG. 10A with two waveguides 1062, which will be aligned with waveguides in the substrate 102 (PLC). If desired, a Y-waveguide coupler may be included in the LN phase modulator chip 160, which will obviate the need for the Y-waveguide coupler 150 shown in FIG. 1. In addition to the waveguides 1062, the LN phase modulator chip 160 includes electrodes 1064 for the voltage drive, which will be electrically connected to electrical traces on the substrate 102 (PLC) using conductive epoxy or solder. The LN phase modulator chip 160 may be, e.g., 1 m×10 mm long with a height of 1 mm.

FIG. 10B illustrates the substrate 102 (PLC) including an etched cavity 1004 that exposes the waveguides 1022 in the side of the etched cavity 1004 in the substrate 102 that are to be aligned with the waveguides 1062 on the LN phase modulator chip 160. The cavity 1004 may be etched using Reactive Ion Etching (RIE). For example, in one implementation, an etching mask that is based on the dimensions of the LN phase modulator chip 160 is used to define the size and location of the etched cavity 1004 so that the waveguides 1022 in the substrate 102 will be horizontally aligned with the waveguides 1062 on the LN phase modulator chip 160. The depth of the etched cavity 1004 may be controlled by calibrating the RIE etch rate, so that the waveguides 1022 in the substrate 102 will be vertically aligned with the waveguides 1062 on the LN phase modulator chip 160. In one implementation, a number of mesas 1006 may be etched into the cavity 1004, e.g., using a two-step etching processes. For example, a first etching step may be used to etch to a proper depth to define the top of the mesas 1006 which will support the LN phase modulator chip 160 so that the waveguides 1022 in the substrate 102 in proper vertical alignment with the waveguides 1062 on the LN phase modulator chip 160. The etching depth to form mesas 1006 may be determined based on the thickness of the cladding layer disposed over the waveguides 1022 on the substrate 102 forming the top surface of the substrate 102 and the thickness of the cladding layer disposed over the waveguides 1062 on the LN phase modulator chip 160. For example, the cladding layer on the substrate 102 may be 10 microns and the etch depth may be 11-13 microns to compensate for cladding materials over the waveguides 1062 on the LN phase modulator chip 160, so that the waveguides 1062 of the LN phase modulator chip 160 are vertically aligned with the waveguides 1022 in the substrate 102. Therefore, the surface of the LN phase modulator chip 160 may be used as a reference plane for passive vertical alignment of the waveguides 1022 in the substrate 102 and the waveguides 1062 on the LN phase modulator chip 160.

A second RIE etch process, using a second mask to define the mesas 1006 may be used to deepen the etched cavity 1004 to provide space of conductive epoxy for mounting the LN phase modulator chip 160. As illustrated, electrode traces 1008 are formed on the substrate 102 and into the etched cavity 1004 after the etching process. FIG. 10C illustrates the LN phase modulator chip 160 inverted and mounted to the substrate 102 with conductive epoxy 1010 to connect the electrode traces 1008 on the substrate 102 to the electrodes 1064 on the LN phase modulator chip 160.

Figure 11A:
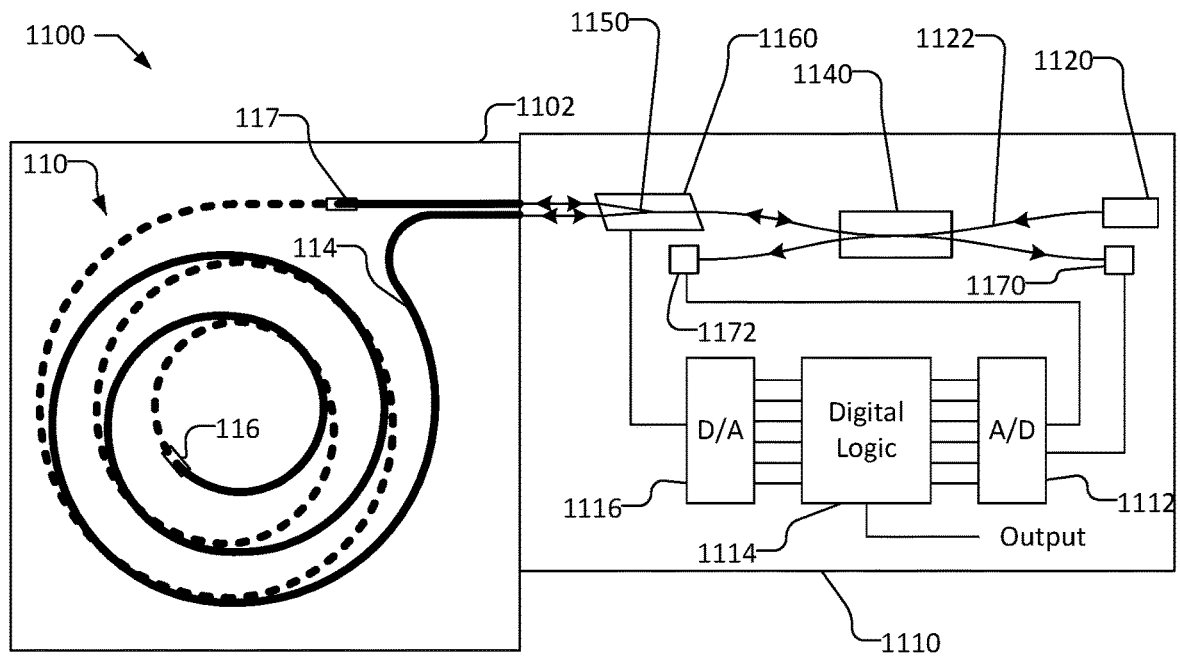
FIGS. 11A and 11B illustrate a top view of other embodiments of a waveguide optical gyroscope.
Figure 11B:
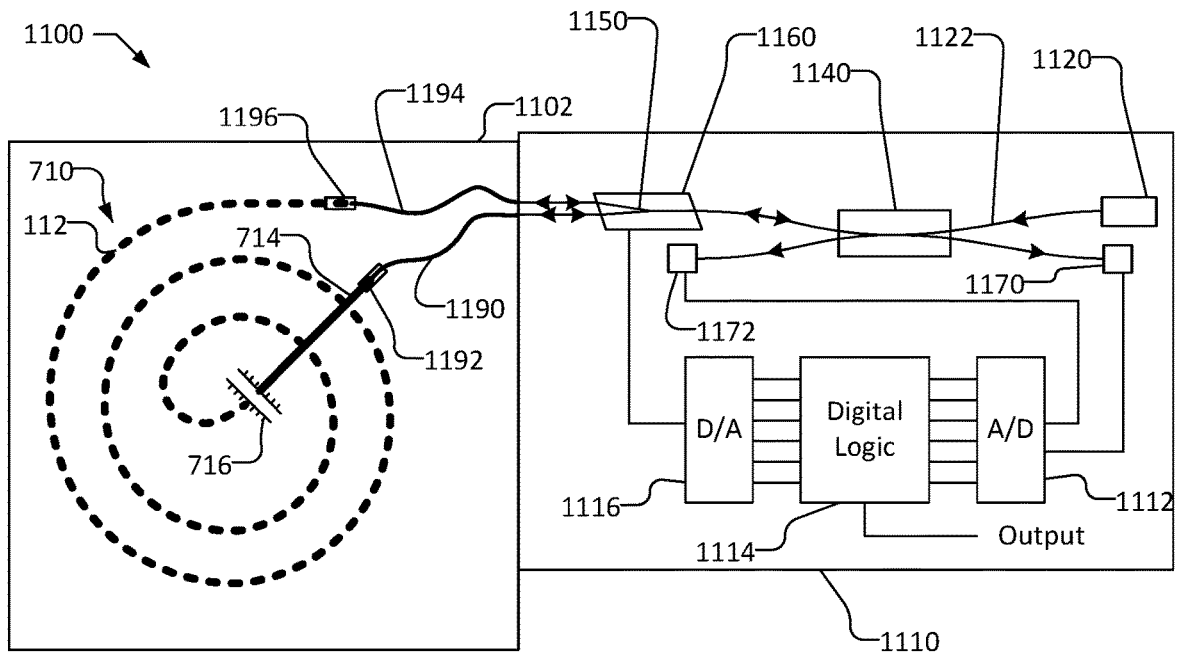

If desired, one or more the components of the waveguide optical gyroscope may be located off-chip, i.e., on a different substrate than the substrate upon which the multilayer waveguide rotation sensor 110 is disposed. FIG. 11A illustrates a top view of a waveguide optical gyroscope 1100 that includes a multilayer waveguide rotation sensor 110 on substrate 1102. A separate substrate 1110 that is optically coupled to substrate 1102, e.g., directly or via intervening components, such as optical fibers, includes the light source 1120, waveguides 1122, an X-waveguide coupler 1140 and a modulator chip 1160, which is illustrated as including a Y-waveguide coupler 1150, and detector (photodiode) 1170 and RIN detector (photodiode) 1172. Additionally, as illustrated in FIG. 11A, the substrate 1110 may include the electronics, including an analog to digital (A/D) converter 1112 to digitize the signals from photodiode 1170 (and 1172), digital logic 1114 to analyze the signals and produce an output indicating a transmission change due to the a phase shift induced by the Sagnac effect as the waveguide optical gyroscope 1100 rotates, and digital to analog (D/A) converter 1116 to drive the closed loop control of the modulation of the modulator chip 1160 and the light source 1120. It should be understood that the waveguide optical gyroscope 1100 is not limited to the multilayer waveguide rotation sensor 110 from FIG. 1, but any embodiment of the waveguide rotation sensor disclosed herein may be used. For example, as illustrated in FIG. 11B, the waveguide rotation sensor 710 illustrated in FIG. 7, may be coupled to separate substrate 1110, e.g., using an optical fiber 1190, which may be coupled to the linear waveguide 714 by an optical coupler 1192. If desired, the optical fiber 1190 may replace a portion or the entirety of the linear waveguide 714, e.g., optical coupler 1192 replaces vertical waveguide coupler 716, and is coupled to the inside diameter of the coil 112. When the optical fiber 1190 is coupled to the inside diameter of the coil 112, the waveguide rotation sensor is functionally a single layer waveguide rotation sensor and, accordingly, coil 112 may be on the upper layer rather than the lower layer, and optical coupler 1192 need not be a vertical coupler. As illustrated, outside diameter of the coil 112 may similarly be coupled to an optical fiber 1194 via optical coupler 1196, which need not be a vertical coupler if coil 112 is on the upper layer. The optical fiber 1190 coupled to or replacing linear waveguide 714 (and optical fiber 1194, if used) may be optically coupled to the separate substrate 1110, e.g., the Y-waveguide coupler 1150.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. An optical gyroscope comprising:
a multilayer waveguide rotation sensor disposed on a substrate, the multilayer waveguide rotation sensor comprising:
a first waveguide that is a non-intersecting, spiraling coil;
a second waveguide vertically separated from the first waveguide;
a vertical waveguide coupler optically coupling the first waveguide to the second waveguide; and
a phase modulator chip disposed in a cavity in the substrate, wherein at least one of the first waveguide and the second waveguide is exposed through a sidewall of the cavity, the phase modulator chip comprising waveguides, the phase modulator chip positioned within the cavity in the substrate to horizontally and vertically align and optically couple the waveguides of the phase modulator chip with at least one of the first waveguide and the second waveguide exposed through the sidewall of the cavity.

2. The optical gyroscope of claim 1, wherein the second waveguide is a non-intersecting, spiraling coil, wherein the first waveguide coils in an opposite direction than the second waveguide coils.

3. The optical gyroscope of claim 2, wherein the first waveguide has a first width and the second waveguide has a second width that is different than the first width.

4. The optical gyroscope of claim 2, wherein the vertical waveguide coupler is located at an inside diameter of the first waveguide and the second waveguide and wherein input light enters and output light exits at an outside diameter of the first waveguide and the second waveguide.

5. The optical gyroscope of claim 2, wherein the second waveguide is vertically separated from the first waveguide by a distance that is at least 1.5 times a width of the first waveguide or the second waveguide.

6. The optical gyroscope of claim 1, wherein the second waveguide is a linear waveguide that orthogonally crosses the first waveguide.

7. The optical gyroscope of claim 1, wherein the vertical waveguide coupler evanescently couples the first waveguide and the second waveguide.

8. The optical gyroscope of claim 7, wherein the vertical waveguide coupler comprises:
a non-linearly tapered portion at an end of the first waveguide; and
a non-linearly tapered portion at an end of the second waveguide that overlies the non-linearly tapered portion at the end of the first waveguide.

9. The optical gyroscope of claim 8, wherein the non-linearly tapered portion at the end of the first waveguide comprises at least three regions with different non-linear taper geometries.

10. The optical gyroscope of claim 8, wherein the non-linearly tapered portion at the end of the first waveguide is tangentially tapered and wherein the non-linearly tapered portion at the end of the second waveguide is tangentially tapered.

11. The optical gyroscope of claim 7, wherein the second waveguide is vertically separated from the first waveguide by a distance that is at least 1.5 times a width of the first waveguide or the second waveguide, and wherein the vertical waveguide coupler has an interaction length to evanescently couple the first waveguide and the second waveguide with at least 80% coupling efficiency.

12. The optical gyroscope of claim 7, wherein the vertical waveguide coupler has a radius of curvature that is at least 1.5 times a minimum radius of curvature supported by the first waveguide and the second waveguide.

13. The optical gyroscope of claim 1, wherein the second waveguide is coupled to a third waveguide with a second vertical waveguide coupler and the third waveguide is exposed through the sidewall of the cavity, and wherein the phase modulator chip is positioned within the cavity in the substrate to horizontally and vertically align and optically couple the waveguides of the phase modulator chip with to the first waveguide and the third second waveguide exposed through the sidewall of the cavity.

14. The optical gyroscope of claim 1, further comprising electrode traces on a bottom of the cavity, wherein the phase modulator chip is electrically connected to electrode traces disposed on a bottom of the cavity in the substrate.

15. An optical gyroscope comprising:
a substrate;
a multilayer waveguide rotation sensor disposed on the substrate and comprising a plurality of waveguides that overlie each other and are vertically separated, wherein at least one of the waveguides in the plurality of waveguides is a non-intersecting, spiraling coil;
a light source disposed on the substrate and optically coupled to provide light to the multilayer waveguide rotation sensor through an X-waveguide coupler disposed on the substrate and through a modulator chip disposed in a cavity in the substrate wherein at least one of the plurality of waveguides is exposed through a sidewall of the cavity, the modulator chip comprising waveguides, the modulator chip positioned within the cavity in the substrate to horizontally and vertically align and optically couple the waveguides of the modulator chip with the least one of the plurality of waveguides exposed through the sidewall of the cavity; and
a detector disposed on the substrate and optically coupled to receive light from the multilayer waveguide rotation sensor through the modulator chip and the X-waveguide coupler.

16. The optical gyroscope of claim 15, further comprising electrode traces on a bottom of the cavity, wherein the modulator chip is electrically connected to electrode traces disposed on a bottom of the cavity in the substrate.

17. The optical gyroscope of claim 15, further comprising a waveguide isolator disposed on the substrate between the light source and the X-waveguide coupler.

18. The optical gyroscope of claim 15, wherein at least two waveguides in the multilayer waveguide rotation sensor are each non-intersecting, spiraling coils that coil in opposite directions.

19. The optical gyroscope of claim 18, wherein the light source is optically coupled to the at least two waveguides at outside diameters of the non-intersecting, spiraling coils, the optical gyroscope further comprising a vertical waveguide coupler that optically couples the at least two waveguides at inside diameters of the non-intersecting, spiraling coils.

20. The optical gyroscope of claim 18, wherein a first waveguide has a first width and a second waveguide has a second width that is different than the first width.

21. The optical gyroscope of claim 18, wherein a second waveguide is vertically separated from a first waveguide by a distance that is at least 1.5 times a width of the first waveguide or the second waveguide.

22. The optical gyroscope of claim 15, wherein at least one of the waveguides is a linear waveguide that orthogonally crosses the at least one of the waveguides that is a non-intersecting, spiraling coil.

23. The optical gyroscope of claim 15, the optical gyroscope further comprising a vertical waveguide coupler that optically couples at least two waveguides in the plurality of waveguides, wherein the vertical waveguide coupler evanescently couples the at least two waveguides.

24. The optical gyroscope of claim 15, wherein a first waveguide of the least one of the plurality of waveguides is exposed through the sidewall of the cavity, and a second waveguide of the plurality of waveguides is coupled to a third waveguide with a vertical waveguide coupler and the third waveguide is exposed through the sidewall of the cavity, and wherein the modulator chip is positioned within the cavity in disposed on the substrate to horizontally and vertically align and optically couple the waveguides of the modulator chip with and the first waveguide and the second waveguide exposed through the sidewall of the cavity.

25. An optical gyroscope comprising:
a waveguide rotation sensor disposed on a substrate, the waveguide rotation sensor comprising:
a first waveguide that is a non-intersecting, spiraling coil, wherein a first end of the first waveguide at an outside diameter of the non-intersecting, spiraling coil is exposed through a sidewall in a cavity of the substrate;
a first waveguide coupler disposed on the substrate and optically coupled to a second end of the first waveguide that is at an inside diameter of the non-intersecting, spiraling coil; and
a phase modulator chip disposed in the cavity in the substrate, the phase modulator chip comprising waveguides, the phase modulator chip positioned within the cavity in the substrate to horizontally and vertically align and optically couple one of the waveguides of the phase modulator chip with the first end of the first waveguide through the sidewall of the cavity.

26. The optical gyroscope of claim 25, wherein the first waveguide coupler is optically coupled to an optical fiber.

27. The optical gyroscope of claim 25, further comprising a second waveguide vertically separated from the first waveguide, wherein the first waveguide coupler is a vertical waveguide coupler optically coupling the first waveguide to the second waveguide.

28. The optical gyroscope of claim 27, wherein the second waveguide is a non-intersecting, spiraling coil, wherein the first waveguide coils in an opposite direction than the second waveguide coils, wherein the first waveguide coupler is located at an inside diameter of the second waveguide and wherein input light enters and output light exits at the outside diameter of the first waveguide and an outside diameter of the second waveguide.

29. The optical gyroscope of claim 28, wherein the first waveguide has a first width and the second waveguide has a second width that is different than the first width.

30. The optical gyroscope of claim 28, wherein the second waveguide is vertically separated from the first waveguide by a distance that is at least 1.5 times a width of the first waveguide or the second waveguide.

31. The optical gyroscope of claim 27, wherein the second waveguide is a linear waveguide that orthogonally crosses the first waveguide.

32. The optical gyroscope of claim 27, wherein the second waveguide is optically coupled to a third waveguide with a second vertical waveguide coupler and a second end of the third waveguide is exposed through the sidewall of the cavity, the phase modulator chip is positioned within the cavity in the substrate to horizontally and vertically align and optically couple the one of the waveguides of the phase modulator chip with the first end of the first waveguide through the sidewall of the cavity and another one of the waveguides of the phase modulator chip with the second end of the third waveguide exposed through the sidewall of the cavity.

* * * * *